United States Patent
Yang et al.

(10) Patent No.: US 11,290,544 B2
(45) Date of Patent: Mar. 29, 2022

(54) DATA TRANSMISSION METHODS APPLIED TO A PROXY SERVER OR A BACKEND SERVER, AND DATA TRANSMISSION SYSTEM

(71) Applicant: WANGSU SCIENCE & TECHNOLOGY CO., LTD., Shanghai (CN)

(72) Inventors: Pengcheng Yang, Shanghai (CN); Wensheng Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/771,618

(22) PCT Filed: Oct. 31, 2018

(86) PCT No.: PCT/CN2018/113025
§ 371 (c)(1),
(2) Date: Jun. 10, 2020

(87) PCT Pub. No.: WO2020/077680
PCT Pub. Date: Apr. 23, 2020

(65) Prior Publication Data
US 2020/0358857 A1    Nov. 12, 2020

(30) Foreign Application Priority Data
Oct. 19, 2018   (CN) .......................... 201811223257.8

(51) Int. Cl.
*H04L 67/146*   (2022.01)
*H04L 67/2871*  (2022.01)
(Continued)

(52) U.S. Cl.
CPC ........ *H04L 67/146* (2013.01); *H04L 67/2871* (2013.01); *H04L 67/327* (2013.01);
(Continued)

(58) Field of Classification Search
CPC . H04L 67/146; H04L 67/2871; H04L 67/327; H04L 67/42; H04L 69/163; H04L 67/02
(Continued)

(56) References Cited

U.S. PATENT DOCUMENTS 5,774,660 A * 6/1998 Brendel ................. H04L 29/06
709/201
5,941,988 A   8/1999 Bhagwat et al.
(Continued)

FOREIGN PATENT DOCUMENTS

CN    101296238 A    10/2008
CN    101635663 A    1/2010
(Continued)

OTHER PUBLICATIONS

The China National Intelleectual Property Administration (CNIPA) The China Search Report for 201811223257.8 dated Dec. 31, 2019 5 Pages.
(Continued)

*Primary Examiner* — Nicholas R Taylor
*Assistant Examiner* — Chong G Kim (57) ABSTRACT

A data transmission method includes: receiving a request packet sent by a client through a first TCP connection established with the client; selecting a backend server based on the request packet, and establishing a second TCP connection with the selected backend server; and enabling identification information of the first TCP connection to be included in the request packet, and sending the request packet to the backend server through the second TCP connection to allow the backend server to directly feed back
(Continued)

a generated response packet to the client based on the identification information of the first TCP connection, where the identification information of the first TCP connection includes a client address.

14 Claims, 9 Drawing Sheets

(51) Int. Cl.
*H04L 67/63* (2022.01)
*H04L 67/01* (2022.01)
*H04L 69/163* (2022.01)
*H04L 67/02* (2022.01)

(52) U.S. Cl.
CPC ............ *H04L 67/42* (2013.01); *H04L 69/163* (2013.01); *H04L 67/02* (2013.01)

(58) Field of Classification Search
USPC ........................................................ 709/203
See application file for complete search history.

(56) References Cited

U.S. PATENT DOCUMENTS

| | | | |
|---|---|---|---|
| 7,269,654 B2 | 9/2007 | Srinivas | |
| 10,412,159 B1* | 9/2019 | McCullagh | ......... H04L 67/1038 |
| 2004/0260745 A1* | 12/2004 | Gage | ................ H04L 29/12018 |
| | | | 709/200 |
| 2009/0177788 A1 | 7/2009 | Ishikawa et al. | |
| 2011/0225231 A1* | 9/2011 | Bansal | ................ H04L 12/4641 |
| | | | 709/203 |
| 2013/0080561 A1 | 3/2013 | Fox et al. | |
| 2014/0006479 A1 | 1/2014 | Maloo | |
| 2014/0258705 A1* | 9/2014 | Roskind | .............. H04L 67/2814 |
| | | | 713/150 |
| 2016/0094513 A1* | 3/2016 | Friedel | ................ H04L 67/1008 |
| | | | 709/245 |
| 2017/0054640 A1* | 2/2017 | Xue | .......................... H04L 1/00 |
| 2018/0063231 A1* | 3/2018 | Park | .................... G06F 9/45558 |
| 2018/0176307 A1* | 6/2018 | Kancherla | .............. H04L 67/141 |

FOREIGN PATENT DOCUMENTS

| | | | |
|---|---|---|---|
| CN | 101924771 A | 12/2010 | |
| CN | 103491065 A | 1/2014 | |
| CN | 103533080 A | 1/2014 | |
| CN | 104767781 A | 7/2015 | |
| CN | 105554065 A | 5/2016 | |
| CN | 105897849 A | 8/2016 | |
| CN | 105915658 A | 8/2016 | |
| CN | 107979592 A | 5/2018 | |
| WO | WO-2017050117 A1 * | 3/2017 | ......... H04L 63/1441 |

OTHER PUBLICATIONS

The China National Intelleectual Property Administration (CNIPA) The China Search Report for 201811223257.8 dated Aug. 3, 2020 3 Pages.
The China National Intelleectual Property Administration (CNIPA) The China Search Report for 201811223257.8 dated Nov. 13, 2020 1 Pages.
The World Intellectual Property Organization (WIPO) International Search Report for PCT/CN2018/113025 dated Jun. 27, 2019 5 pages.

* cited by examiner

DATA TRANSMISSION METHODS APPLIED TO A PROXY SERVER OR A BACKEND SERVER, AND DATA TRANSMISSION SYSTEM

CROSS-REFERENCES TO RELATED APPLICATIONS

This application is a national phase entry under 35 U.S.C § 371 of International Application No. PCT/CN2018/113025 filed on Oct. 31, 2018, which claims priority of Chinese Patent Application 201811223257.8, filed with the State Intellectual Property Office of P. R. China on Oct. 19, 2018, the entire contents of all of which are incorporated herein by reference.

FIELD OF DISCLOSURE

The present disclosure generally relates to the field of Internet technology and, more particularly, relates to a data transmission method, system and proxy server.

BACKGROUND

Figure 1:
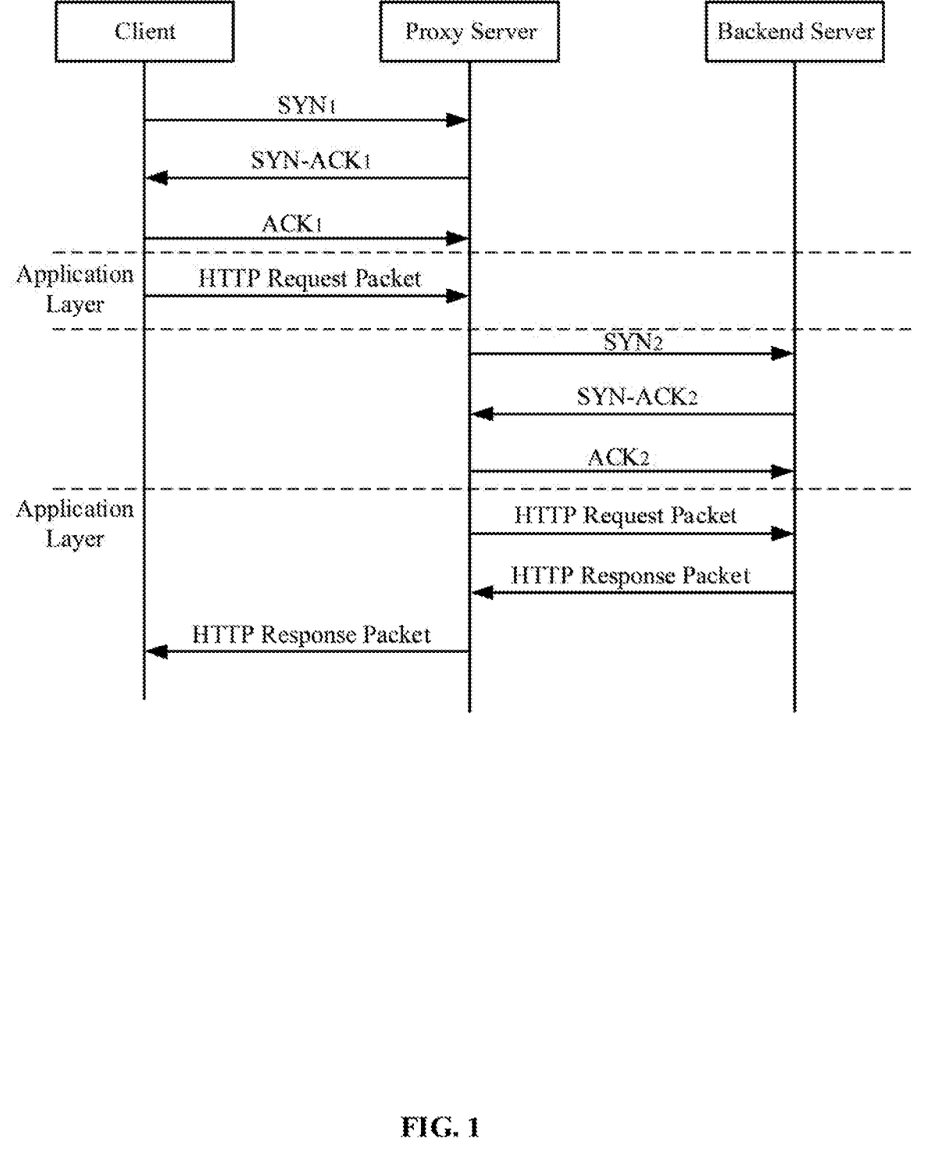
FIG. 1 is an overall flowchart of load balancing of an application-level proxy in the existing technologies.

As the volume of website and application traffic increases, a single server may no longer meet the needs of certain applications. Instead, a cluster of multiple servers is needed. Accordingly, the load balancing of an application-level proxy is necessary. As shown in FIG. 1, a proxy server is located between a client and a to-be-accessed backend server. For the client, the proxy server plays the role of a server. For the backend server, the proxy server plays the role of a client. Here, the client first performs a three-way handshake with the proxy server (an information exchange process of SYN1, SYN-ACK1, and ACK1), and establishes a TCP connection. Then the proxy server selects a backend server, performs a three-way handshake with the backend server (an information exchange process of SYN2, SYN-ACK2, and ACK2), and establishes another TCP connection. After the connections are established, the proxy server transparently transmits the data in both directions, and serves as an intermediate to assist the client and the backend server in implementing network communication.

However, the applicant of the present disclosure has found that, while the load balancing of the application level proxy may ensure compatibility of the existing network and may implement complex protocol processing at the application layer, but at the expense of server performance and bandwidth capability of the internal network. In the load balancing of the application-level proxy, a packet has been copied three times, which respectively happen during the process that the backend server sends the packet to the proxy server, the process that the proxy server receives the packet from the backend server, and the process that the proxy server sends the packet to the client. The three coping processes themselves do not consume network card performance. But with the processes of transmitting and receiving the packet three times, the network card performance and network bandwidth are consumed. In addition, for the proxy server, there is a context switching process from a kernel layer to an application layer when a copy of the packet is generated. The inter-memory copying process, especially the inter-memory copying process between the kernel layer and the application layer, may consume a large amount of CPU resources, and the context switching process also consumes a large amount of resources. Accordingly, the above whole process clearly causes extra consumption of the internal performance of the proxy server.

BRIEF SUMMARY OF THE DISCLOSURE

The objective of the embodiments of the present disclosure is to provide a data transmission method, system, and proxy server, which reduce the number of times of copying of a packet, reduce the consumption of the CPU resources of the proxy server and the network card resources, and reduce the network bandwidth consumption inside the server cluster.

To solve the above technical problems, the embodiments of the present disclosure provides a data transmission method applied to a proxy server. The method includes:

receiving a request packet sent by a client through a first TCP connection established with the client;

selecting a backend server based on the request packet, and establishing a second TCP connection with the selected backend server; and enabling identification information of the first TCP connection to be included in the request packet, and sending the request packet to the backend server through the second TCP connection to allow the backend server to directly feed back a generated response packet to the client based on the identification information of the first TCP connection, where the identification information of the first TCP connection includes a client address.

Embodiments of the present disclosure further provide a data transmission method applied to a backend server. The method includes:

receiving a request packet sent by the proxy server through a second TCP connection established with the proxy server; and directly feeding back a generated response packet to the client based on identification information of a first TCP connection included in the request packet, where the first TCP connection is a TCP connection established between the client and the proxy server, and the identification information of the first TCP connection includes a client address.

Embodiments of the present disclosure further provide a proxy server, including:

at least one processor; and, a memory communicatively coupled to at least one processor; where the memory stores instructions executable by the at least one processor, the instructions being executed by the at least one processor to cause the at least one processor to implement the above-described data transmission method applied to a proxy server.

Embodiments of the present disclosure further provide a computer-readable storage medium storing a computer program that, when executed by a processor, implements the above-described data transmission method applied to a proxy server.

Embodiments of the present disclosure further provide a data transmission system, including: a proxy server and a plurality of backend servers; where the proxy server includes:

a receiving module that is configured to receive a request packet sent by a client through a first TCP connection established with the client, a selection module that is configured to select a backend server based on the request packet, and establish a second TCP connection with the selected backend server, and a frontend module that is configured to enable the identification information of the first TCP connection to be included in the request packet, and send the request packet to the backend server through the second TCP connection;
and a backend server includes:
a backend module that is configured to directly feed back a generated response packet to the client according to the identification information of the first TCP connection, where the identification information of the first TCP connection includes the client address.

Compared with the existing technologies, in the embodiments of the present disclosure, after the proxy server establishes connections with the client and the backend server, the proxy server modifies the request packet transmitted by the client, so that the request packet includes the identification information of the connection established between the proxy server and the client. Accordingly, when receiving the request packet, the backend server may directly feed back the response packet to the client based on the client address in the identification information included in the request packet, without forwarding the request packet through the proxy server. In this way, the response packet of the backend server does not need to be forwarded by the application layer and/or the kernel layer of the proxy server, thereby not only reducing the network bandwidth consumption inside the server cluster, reducing the consumption of the network card resources of the proxy server, but also avoiding the copying of the response packet in the proxy server. Accordingly, the goal of reducing the consumption of the CPU resources of the proxy server may be achieved.

Further, enabling the identification information of the first TCP connection to be included in the request packet and sending the request packet to the backend server through the second TCP connection specifically includes: writing, at a kernel layer, the identification information of the first TCP connection into a TCP option of the request packet, and sending, by the kernel layer, the request packet including the written identification information of the first TCP connection to the backend server through the second TCP connection. In this way, the proxy server modifies and forwards the request packet inside the kernel layer, which may avoid context switching between the application layer and the kernel layer, thereby further reducing the consumption of the CPU resources of the proxy server.

Further, after sending, by the kernel layer, the request packet including the identification information of the first TCP connection to the backend server through the second TCP connection, the method further includes: notifying, by the kernel layer, an application layer to disconnect the first TCP connection and the second TCP connection. This allows the timely release of useless resources, which provides a basis for improving the utilization of the proxy server.

Further, after establishing the second TCP connection with the selected backend server, the method further includes: generating mapping logic of the first TCP connection and the second TCP connection, where the mapping logic includes at least a first difference and a second difference, the first difference is a difference between a sequence number of a syn packet from the proxy server to the backend server and a sequence number of a syn packet from the client to the proxy server, and the second difference is a difference between a sequence number of a syn-ack packet from the backend server to the proxy server and a sequence number of a syn-ack packet from the proxy server to the client. In this way, the problem of different sequence numbers used from the client to the proxy server may be solved, which provides a basis for the subsequent proper information exchange between the client and the proxy server.

Further, after enabling the identification information of the first TCP connection to be included in the request packet and sending the request packet to the backend server through the second TCP connection, the method further includes: receiving an acknowledgment packet from the client; determining a sequence number of the acknowledgement packet and an acknowledge sequence number of the acknowledgment packet; adding the sequence number of the acknowledgement packet to the first difference to obtain a new sequence number, updating the sequence number of the acknowledgement packet with the new sequence number, adding the acknowledge sequence number of the acknowledgement packet to the second difference to obtain a new acknowledgement sequence number, and updating the acknowledge sequence number of the acknowledgement packet with the new acknowledgement sequence number; and forwarding the updated acknowledgement packet to a corresponding backend server. In this way, the problem of different sequence numbers used from the proxy server to the backend server may be solved, which provides a basis for the subsequent proper information exchange between the proxy server and the backend server.

Further, when there is no packet received from the client within a preset time period, disconnect the first TCP connection at a kernel layer, and delete the identification information of the first TCP connection. Accordingly, useless resources may be timely released, which provides a basis for improving the resources utilization of the proxy server.

BRIEF DESCRIPTION OF THE DRAWINGS

One or more embodiments of the present disclosure will be exemplified with reference to the accompanying drawings. These exemplifications are not to be constructed as a limitation to the embodiments of the present disclosure. In the companying drawing, elements with like reference numbers refer to like or similar elements. Unless specifically stated, the figures in the accompanying drawings do not constitute a scale limitation.

DETAILED DESCRIPTION

To make the objective, technical solutions, and advantages of the present disclosure clearer, the embodiments of the present disclosure will be made in detail hereinafter with reference to the accompanying drawings. It is to be understood by those skilled in the art that: in the various embodiments of the present disclosure, numerous technical details are set forth in order to provide a reader with a better understanding of the present disclosure. However, even without these technical details and various changes and modifications based on the following embodiments, the technical solutions claimed in the present disclosure may still be implemented.

Figure 2:
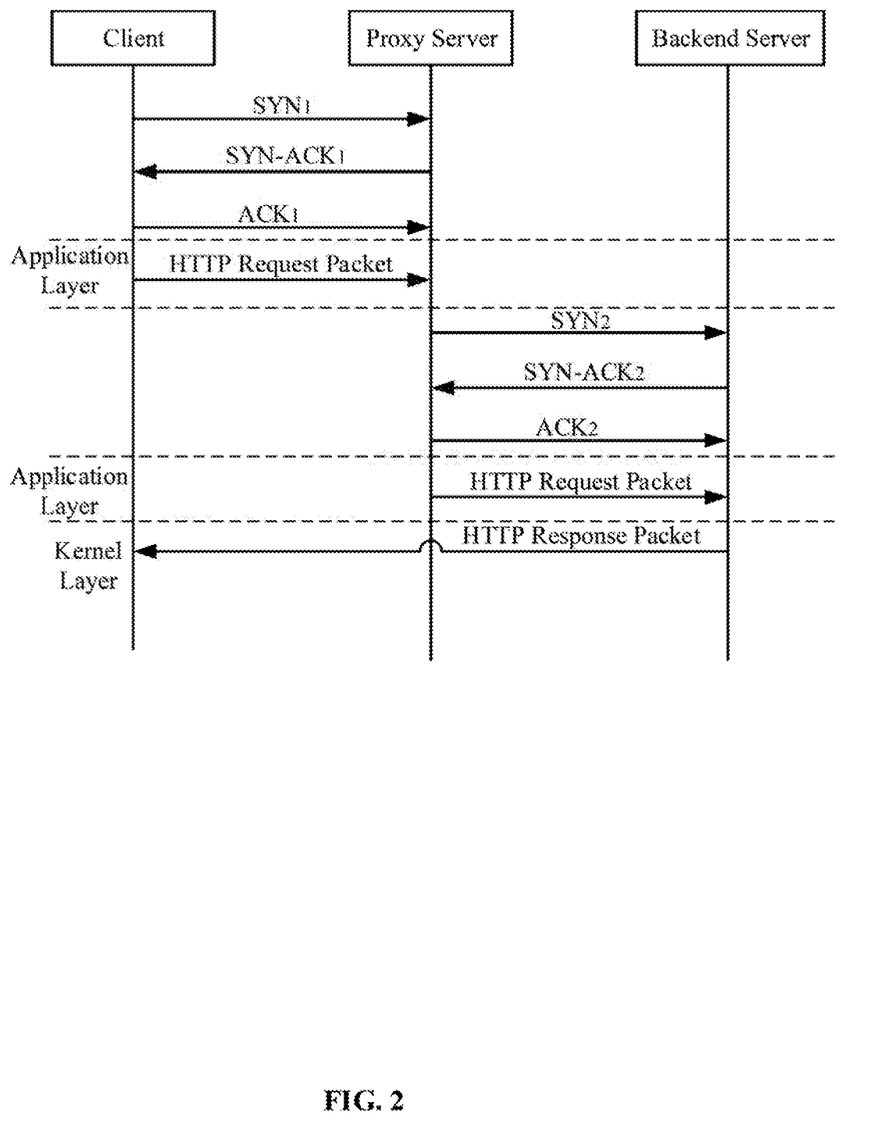
FIG. 2 is an overall flowchart of a data transmission method according to one embodiment.

Embodiment 1 of the present disclosure relates to a data transmission method. A specific process is shown in FIG. 2. The data transmission method in the disclosed embodiment relates to a client, a proxy server, and a backend server. The data transmission method in the disclosed embodiment will be made in detail hereinafter.

Figure 3:
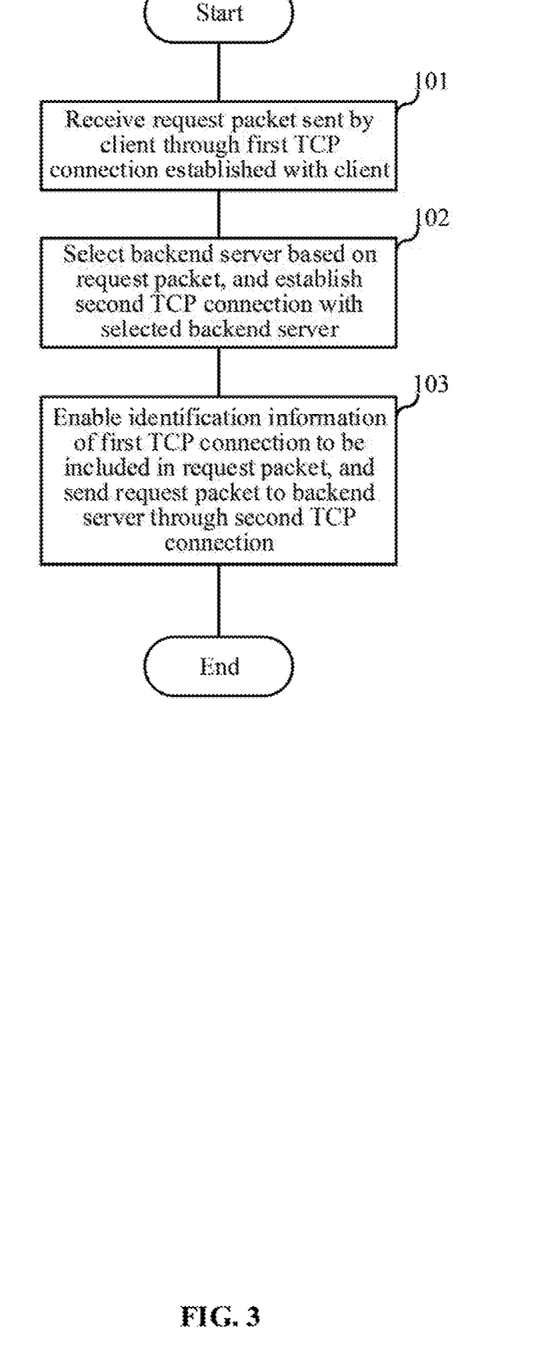
FIG. 3 is a flowchart of a data transmission method applied to a proxy server according to one embodiment.

FIG. 3 illustrates a flowchart of a data transmission method applied to a proxy server consistent with the disclosed embodiment, which is specifically described as follows.

Step 101: The proxy server receives a request packet sent by a client through a first TCP connection established with the client.

Specifically, through <ip_client, port_client>, the client performs a three-way handshake with the proxy server <ip_front1, port_front1> to establish a first TCP connection. Further, the proxy server receives a request packet sent by the client. For example, the request packet received from the client by the proxy server may be an HTTP request packet. The subsequent steps will be illustrated in the following by taking an HTTP request packet as the request packet as an example.

Step 102: The proxy server selects a backend server based on the request packet, and establishes a second TCP connection with the selected backend server.

Specifically, through <ip_front2, port_front2>, the proxy server performs a TCP three-way handshake with the selected backend server <ip_back, port_back> to establish a second TCP connection. Since the proxy server needs to parse the received HTTP request packet and select a backend server using a load balancing algorithm, and these steps are to be performed at an application layer, the kernel layer of the proxy server needs to upload the HTTP request packet to the application layer after receiving the request packet, to allow the application layer to select a backend server. Here, selecting a backend server by the proxy server using a load balancing algorithm is a quite mature technology in the relevant art (e.g., HAProxy, Nginx, etc.), and thus will not be described extensively in detail in the disclosed embodiment.

Step 103: The proxy server enables identification information of the first TCP connection to be included the request packet, and sends the request packet to the backend server through the second TCP connection.

Specifically, the proxy server generates the identification information for the first TCP connection. The identification information of the first TCP connection may be port information. For example, the identification information of the first TCP connection may be <ip_client, port_client, ip_front1, port_front1>. More specifically, the proxy server modifies the HTTP request packet. The proxy server writes the identification information of the first TCP connection into the TCP option of the HTTP request packet, and then sends the HTTP request packet through the second TCP connection to the backend server.

In the disclosed embodiment, Step 103 is implemented in the kernel layer of the proxy server. That is, a frontend module is configured in the kernel layer of the proxy server. The frontend module is configured to modify the request packet, to allow the identification information of the first TCP connection to be included in the request packet. The frontend module sends the request packet to the backend server through the second TCP connection. More specifically, a backend module is configured in the kernel layer of the backend server. The frontend module of the kernel layer of the proxy server sends the request packet to the backend module, of the backend server, that is also located in the kernel layer. In this way, the request packet is modified at the kernel layer of the proxy server and directly sent to the backend server in the kernel layer without any processing in the application layer of the proxy server, thereby avoiding the context switching process between the application layer and the kernel layer and effectively reducing the consumption of the CPU resources of the proxy server.

Figure 4:
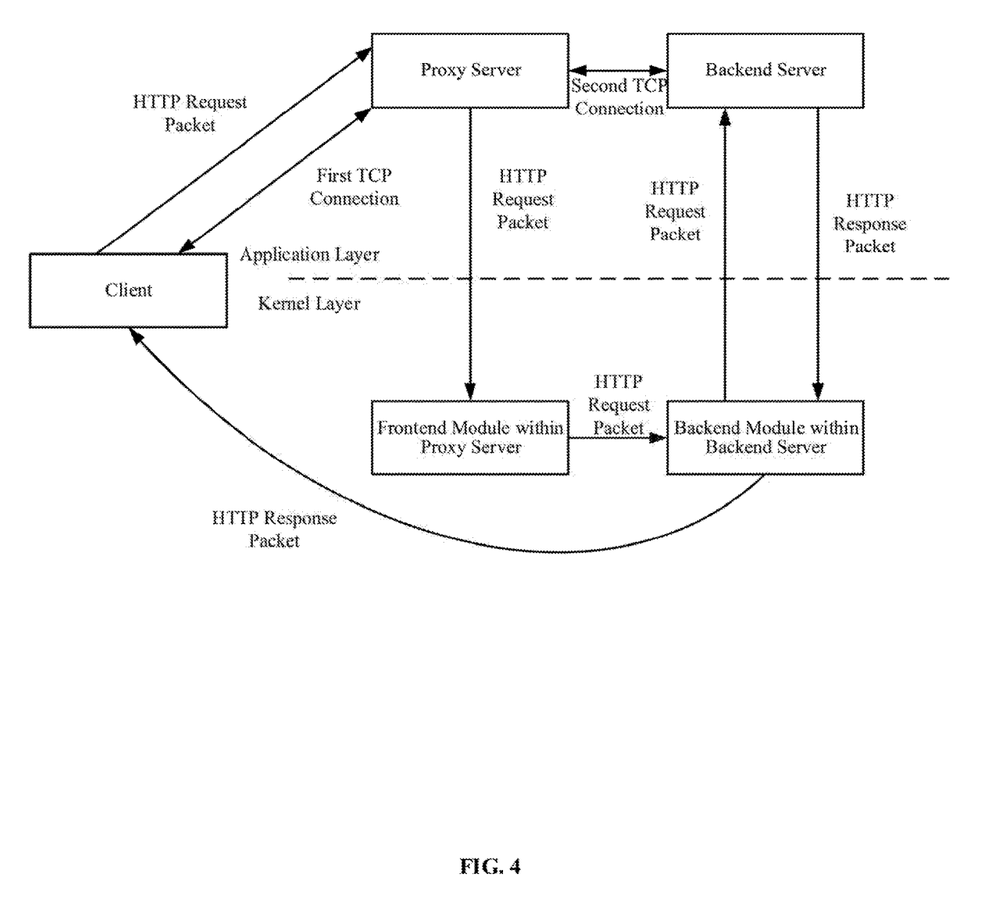
FIG. 4 is a schematic diagram of an overall framework of a data transmission method according to one embodiment.

FIG. 4 clearly shows an information exchange relationship among the client, the proxy server, and the backend server consistent with the disclosed embodiment. Apparently, after the client establishes the first TCP connection with the proxy server, the HTTP request packet is sent to the proxy server. The proxy server selects the backend server based on the request packet and establishes the second TCP connection with the backend server. Moreover, the frontend module of the proxy server allows the identification information of the first TCP connection to be included in the request packet, and sends the request packet to the backend module of the backend server through the second TCP connection. Here, the backend module of the backend server is also located in the kernel layer. Therefore, the transmission of the request packet is directly implemented in the kernel layer of the proxy server and the backend server, thereby effectively reducing the resources consumption of the entire server cluster (including the proxy server and the multiple backend servers).

It should be noted that, in real applications, the frontend module may also pretend to be the client to complete the four-wave of TCP with the application layer of the proxy server, and notify the application layer to release the resource corresponding to the first TCP connection. The frontend module may also pretend to be the backend server to complete the four-wave of TCP with the application layer of the proxy server, and notify the application layer to release the resource (e.g., a socket descriptor, a storage resource, and other resources allocated by the application layer) corresponding to the second TCP connection, to allow the proxy server to release the useless resource(s) in time. In this way, the resources utilization of the proxy server may be improved. Meanwhile, the foregoing processes do not need to involve the client and the backend server, so the processes are transparent to the client and the backend server.

It should be noted that, since completely different sequence numbers are used from the client to proxy server and from the proxy server to backend server, there should be a mechanism—mapping—to convert the sequence number of the packet transmitted through the two connections between each other. Therefore, the proxy server also generates mapping logic for the first TCP connection and the second TCP connection. The mapping logic includes at least a first difference seq_delta1 and a second difference ack_seq_delta1. Here, the first difference is a difference between the sequence number of the syn packet from the proxy server to the backend server and the sequence number of the syn packet from the client to the proxy server. The second difference is a difference between the sequence number of the syn-ack packet from the backend server to the proxy server and the sequence number of the syn-ack packet from the proxy server to the client. Accordingly, given that TCP is a full-duplex communication protocol and the reverse processing is symmetrical, the proxy server also sends the mapping logic of the first TCP connection and the second TCP connection to the backend server, to allow the backend server to conduct a sequence number conversion, thereby ensuring that the client receives the correct packet subsequently.

Figure 5:
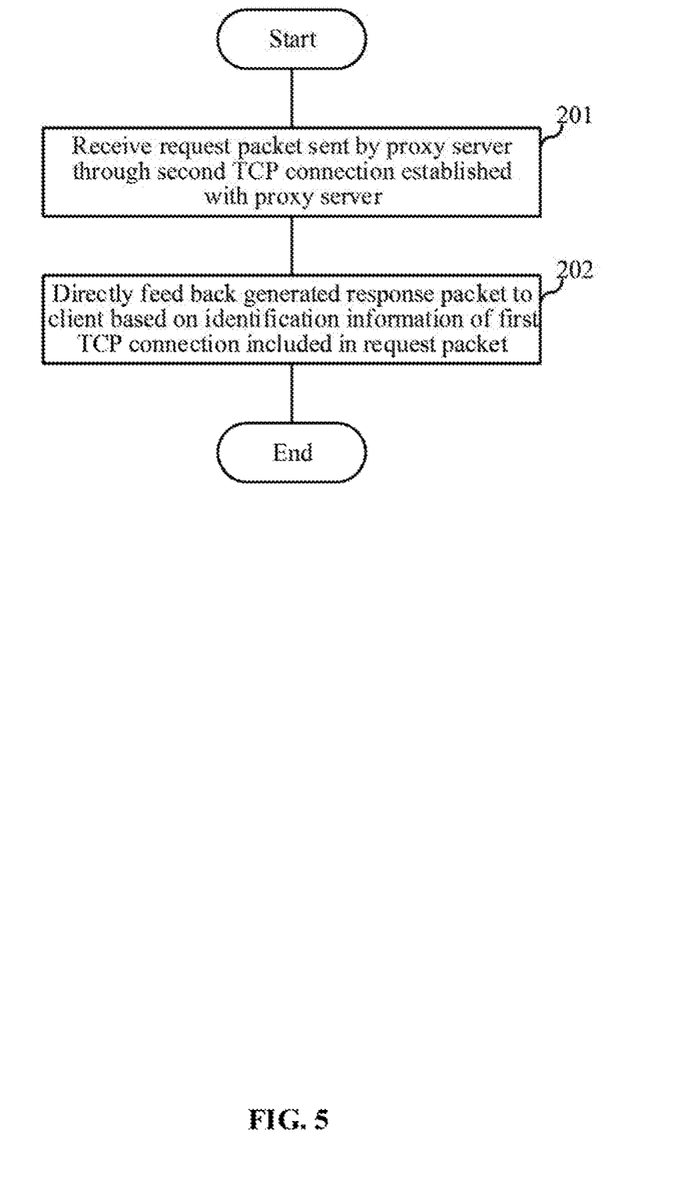
FIG. 5 is a flowchart of a data transmission method applied to a backend server according to the one embodiment.

A specific implementation of the data transmission method for the backend server is made in detail hereinafter. The specific process is shown in FIG. 5.

Step 201: The backend server receives the request packet sent by the proxy server through the second TCP connection established with the proxy server.

Step 202: The backend server directly feeds back a generated response packet to the client based on the identification information of the first TCP connection included in the request packet.

Specifically, each packet arrives at the kernel layer first, which is then delivered to the application layer from the kernel layer. Therefore, after the backend module located at the kernel layer of the backend server receives the request packet sent from the frontend module located at the kernel layer of the proxy server, the backend module at the kernel layer of the backend server sends the request packet to the application layer of the backend server for processing, to allow the application layer of the backend server to generate a response packet corresponding to the request packet. In addition, the application layer of the backend server may issue the response packet to the backend module at the kernel layer of the backend server, to allow the backend module at the kernel layer of the backend server to directly feed back the generated response packet to the client.

More specifically, when the backend module directly feeds back the generated response packet to the client, the backend module needs to perform certain processing on the response packet, e.g., changing the port information of the response packet from <ip_back, port_back, ip_front2, port_front2> to <ip_front1, port_front1, ip_client, port_client>. That is, the destination IP address of the response packet is changed to ip_client, to allow the response packet to be directly sent to the client. Moreover, for the client, it is the proxy server that establishes the TCP connection of the client with the proxy server. Therefore, the port information of the response packet also needs to be changed to <ip_front1, port_front1, ip_client, port_client>, which makes the client consider that the response packet is issued by the proxy server.

It should be noted that, since completely different sequence numbers are used from the client to the proxy server and from the proxy server to the backend server, after the backend server receives the mapping logic of the first TCP connection and the second TCP connection sent by the proxy server, the backend server also modifies the sequence number and acknowledgement sequence number of the response packet before sending the response packet, to ensure an accurate reception of the data at the client. Since the packet length will not change, the sequence number mapping only requires a fixed offset. Therefore, assuming that the sequence number of the response packet is seq and the acknowledgment sequence number is ack_seq, the sequence number of the response packet is changed to the difference between seq and ack_seq_delta1, and the acknowledgment sequence number of the response packet is changed to the difference between ack_seq and seq_delta1.

Compared with the existing technologies, in the disclosed embodiment, after the proxy server establishes the connections with the client and the backend server, the proxy server modifies the request packet through the frontend module at the kernel layer, and directly sends the request packet to the backend module through the frontend module. Without the processing by the application layer, the context switching between the application layer and the kernel layer is avoided, thereby effectively reducing the CPU resources consumption of the proxy server. Moreover, the request packet sent by the frontend module of the proxy server includes the identification information of the connection established between the proxy server with the client. Accordingly, when receiving the request packet, the backend server may directly feed back the response packet to the client based on the client address included in the identification information of the request packet. In this way, the response packet of the backend server does not need to be forwarded by the proxy server, which is not only able to reduce the network bandwidth consumption within the server cluster, reduce the consumption of the network card resources of the proxy server, reduce the time spent by the packet within the server cluster, and improve the quality of service, but is also able to avoid the copying of the response packet within the proxy server, so as to reduce the consumption of the CPU resources of the proxy server.

It should be noted that, in the disclosed embodiment, if the proxy server does not receive the packet from the client within a preset time period, the proxy server disconnects the first TCP connection at the kernel layer, and deletes the identification information for the first TCP connection. This allows the information update and the release of useless resources in time, which provides a basis for improving the utilization of the storage resource of the proxy server. In actual executions, when deleting the identification information of the first TCP connection, the proxy server may also delete the mapping logic of the first TCP connection and the second TCP connection, so that the utilization of the storage resource of the proxy server may be further improved. Similarly, when the backend server does not receive the packet sent by the proxy server through the second TCP connection for a long time, the backend server may delete the identification information of the first TCP connection and delete the mapping logic of the first TCP connection and the second TCP connection, to improve the utilization of its own storage resource of the backend server. Here, the preset time period may be configured by technical staff and saved in the proxy server.

Figure 6:
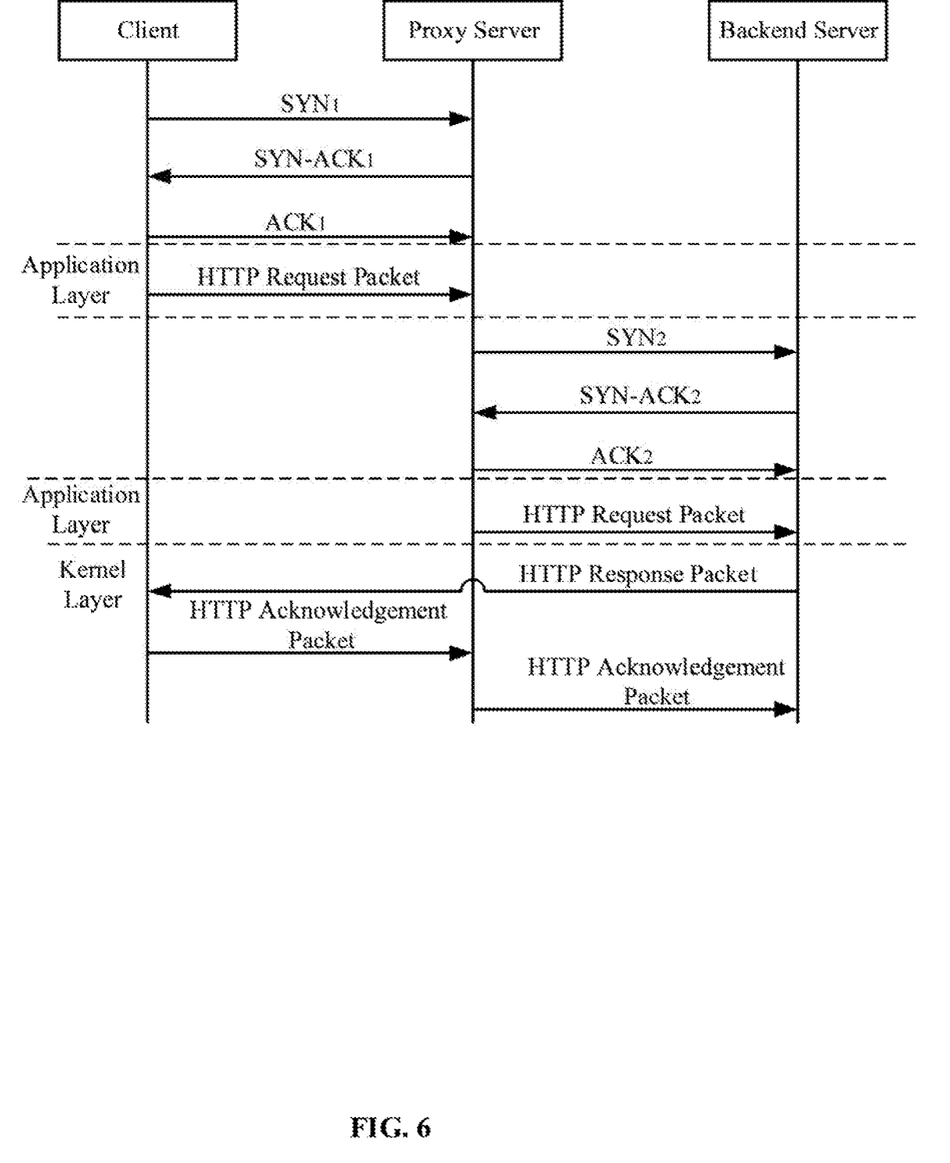
FIG. 6 is an overall flowchart of a data transmission method according to another embodiment.

Embodiment 2 of the present disclosure relates to a data transmission method. The specific process is shown in FIG. 6. In the present embodiment, an interactive flow diagram after the client receives the response packet is illustrated, which is specifically described below.

Figure 7:
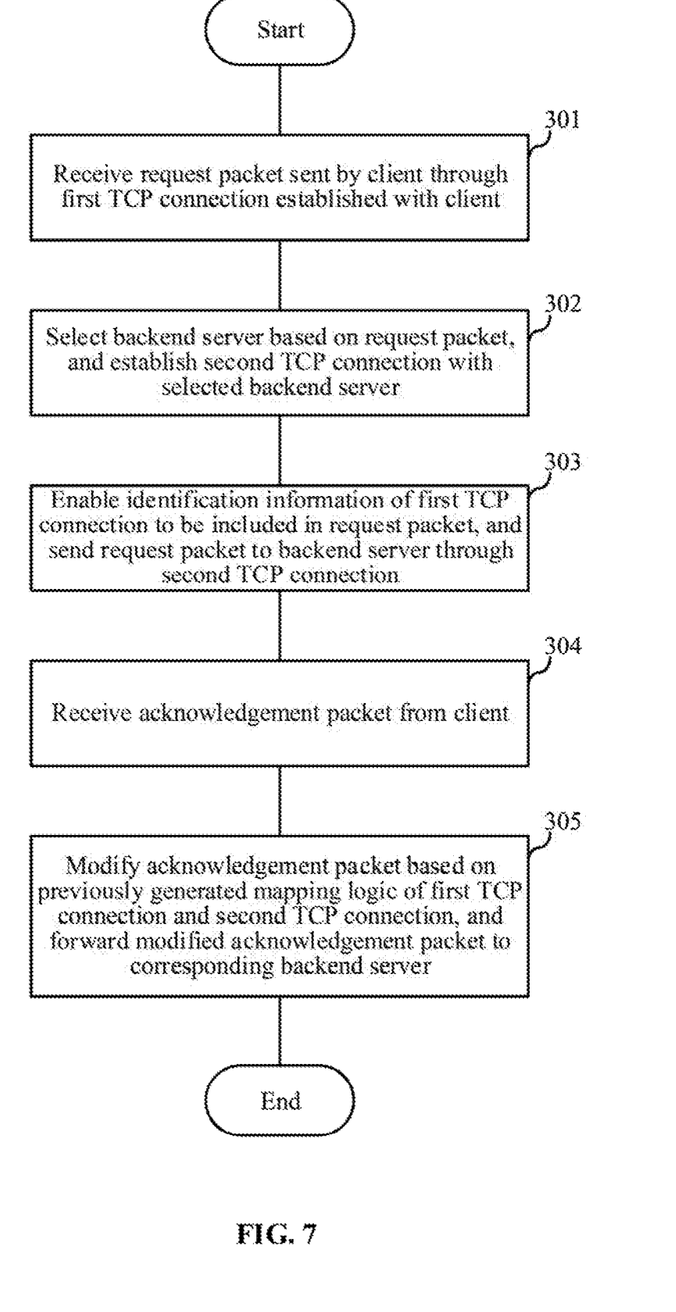
FIG. 7 is a flowchart of a data transmission method applied to a proxy server according to another embodiment.

FIG. 7 shows a flowchart of a data transmission method applied to a proxy server. Steps 301 to 303 in the flowchart of FIG. 7 are substantially the same as Steps 101 to 103 in Embodiment 1. To avoid the repetition, Steps 301 to 303 will not be described in detail in the present embodiment. A person skilled in the art may have Steps 301 to 303 implemented by referring to the content described in Steps 101 to 103. In the following, only Steps 304 and 305 are specifically described.

Step 304: Receive an acknowledgment packet from the client.

Specifically, after receiving the response packet, the client needs to reply an acknowledgment packet. The port information included in the acknowledgement packet is <ip_client, port_client, ip_front1, port_front1>. Since the IP address of the acknowledgment packet is ip_front1, the acknowledgment packet is first sent to the proxy server.

Step 305: Modify the acknowledgment packet according to the previously generated mapping logic of the first TCP connection and the second TCP connection, and forward the modified acknowledgment packet to the corresponding backend server.

Specifically, the way that the proxy server modifies the acknowledgment packet according to the previously generated mapping logic of the first TCP connection and the second TCP connection may include: assume that the acknowledgment packet sequence number is seq1 and the acknowledgment sequence number is ack_seq1, the proxy server then changes the acknowledgment packet sequence number to seq1+seq_delta1 and changes the acknowledgment sequence number to ack_seq1+ack_seq_delta1.

In the disclosed embodiment, the mapping logic may further include a correspondence between the first TCP connection and the second TCP connection. In this way, the proxy server may also modify the quaternion of the acknowledgment packet to <ip_front2, port_front2, ip_back, port_back> based on the correspondence between the first TCP connection and the second TCP connection in the mapping logic. Apparently, since the modified IP address of the acknowledgment packet is ip_back, the acknowledgment packet is forwarded to the backend server.

It should be noted that if a FIN packet is sent by the backend server, it indicates that the backend server wants to disconnect the TCP connection with the client. At this moment, the backend server will modify the sent FIN packet according to the mapping logic, forward the modified FIN packet to the client, and feed back it to the proxy server at the same time, so that the client may reply an ACK acknowledgment packet to the proxy server after receiving the FIN packet. This then allows the proxy server to forward the ACK acknowledgment packet sent by the client to the backend server based on the mapping logic, etc., thereby completing the four-wave of TCP and the closure of the first TCP connection and the second TCP connection at the kernel layer.

It should be noted that, if the first TCP connection and the second TCP connection are closed at the kernel layer, the proxy server may also activate a timeout timer, to delay the release of the identification information of the first TCP connection and the mapping logic of the first TCP connection and the second TCP connection. At the same time, the backend server may also activate a timeout timer, to delay the release of the identification information of the first TCP connection and the mapping logic of the first TCP connection and the second TCP connection, thereby enabling timely cleaning and release of the resources of each server and improving the utilization of the internal resources within the server cluster.

Figure 8:
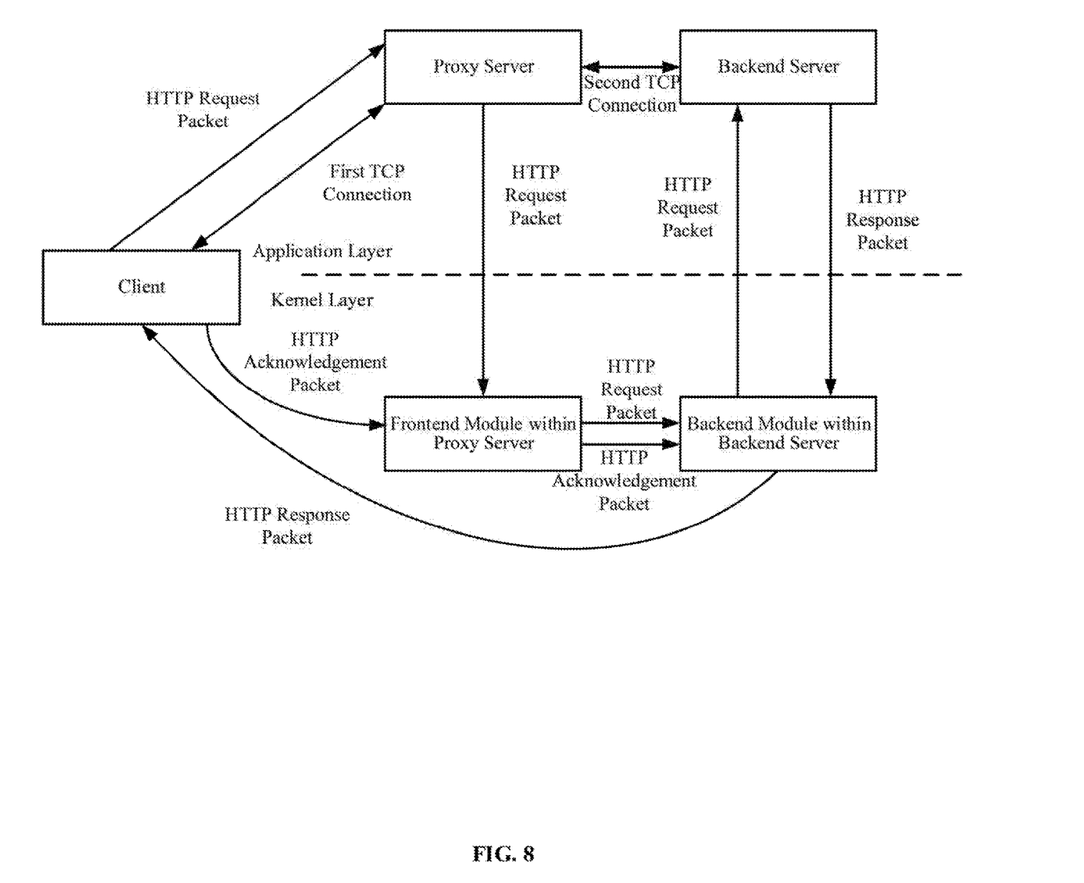
FIG. 8 is a schematic diagram of an overall framework of a data transmission method according to another embodiment.

FIG. 8 shows a clear information exchange relationship between the client, the proxy server, and the backend server in Embodiment 2. Apparently, the later information exchange between the client and the proxy server or the backend server (i.e., Step 304 or Step 305) is directly routed and forwarded at the kernel layer, which are implemented at the network layer, thereby greatly saving the utilization of CPU resources.

The steps of the above various methods are divided merely for the purpose of clear description. During the implementations, multiple steps may be combined into one step or one step may be split into certain steps or decomposed into multiple steps. As long as the same logical relationship is included, these implementations shall still fall within the protection scope of the present disclosure. The addition of insignificant modifications to an algorithm or process, or the introduction of an insignificant design, without changing the core design of the algorithm and process, should still fall within the protection scope of the present disclosure.

Figure 9:
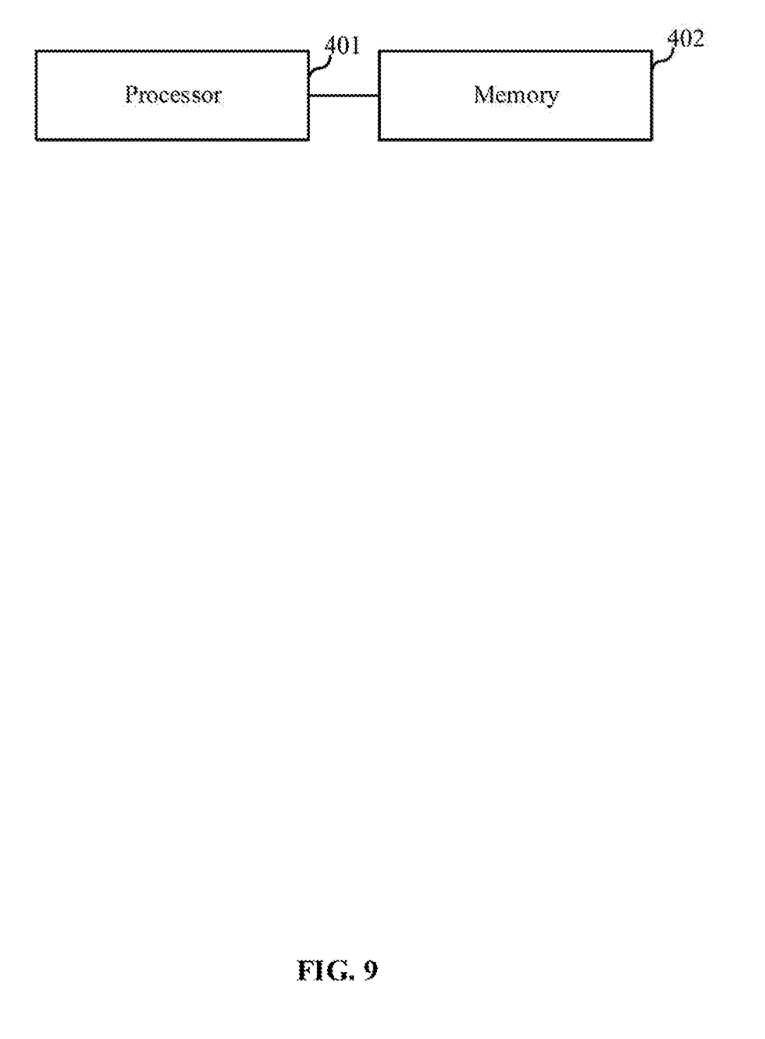
FIG. 9 is a schematic diagram of a proxy server according to another embodiment.

Embodiment 3 of the present disclosure relates to a proxy server. As shown in FIG. 9, the proxy server includes: at least one processor 401, and a memory 402 that is communicably coupled to the at least one processor 401. The memory 402 stores instructions that may be executed by the at least one processor 401. The instructions are executed by the at least one processor 401 to cause the at least one processor 401 to implement the above-described data transmission method applied to the proxy server.

Here, the memory 402 and the processor 401 are connected by a bus. The bus may include any number of interconnected buses and bridges that connect the one or more processors 401 and various circuits of the memory 402. The bus may also connect various other circuits, such as peripherals, voltage regulator, and power management circuits, as is well known in the art, and therefore, will not be further described herein. The bus interface provides an interface between the bus and a transceiver. The transceiver may be an element or a plurality of elements, such as multiple receivers and transmitters, that provide means for communicating with various other devices on a transmission medium. The data processed by the processor 401 is transmitted over the wireless medium via an antenna. Further, the antenna also receives the data and transmits the data to the processor 401.

The processor 401 is responsible for managing the bus and normal processing, and may also provide various functions including timing, peripheral interfacing, voltage regulation, power management, and other control functions. The memory 402 may be used to store data used by the processor 401 in performing certain operations.

Embodiment 4 of the present disclosure relates to a computer-readable storage medium storing a computer program. The computer program, when executed by the processor, implements the above-described data transmission method applied to the proxy server.

Embodiment 5 of the present disclosure relates to a backend server, comprising: at least one processor; and a memory communicatively coupled to the at least one processor; where the memory stores instructions executable by the at least one processor, the instructions being executed by the at least one processor to cause the at least one processor to implement the above-described data transmission method applied to the proxy server.

Here, the memory and the processor are connected by a bus. The bus may include any number of interconnected buses and bridges that connect one or more processors and various circuits of the memory. The bus may also connect various other circuits, such as peripherals, voltage regulators, and power management circuits, as is well known in the art, and therefore, will not be further described herein. The bus interface provides an interface between the bus and a transceiver. The transceiver may be an element or a plurality of elements, such as multiple receivers and transmitters, that provide means for communicating with various other devices on a transmission medium. The data processed by the processor is transmitted over the wireless medium via an antenna. Further, the antenna also receives the data and transmits the data to the processor.

The processor is responsible for managing the bus and normal processing, and may also provide various functions including timing, peripheral interfaces, voltage regulation, power management, and other control functions. The memory may be used to store data used by the processor in performing operations.

Embodiment 6 of the present disclosure relates to a computer-readable storage medium storing a computer program. The computer program, when executed by the processor, implements the above-described data transmission method applied to the backend server.

Embodiment 7 of the present disclosure relates to a data transmission system comprising: a proxy server and a plurality of backend servers. The following is a detailed description:

The proxy server in the disclosed embodiment includes a receiving module that is configured to receive a request packet sent by the client by using a first TCP connection established with the client, a selection module that is configured to select a backend server based on the request packet, and establish a second TCP connection with the selected backend server, and a frontend module that is configured to enable the identification information of the first TCP connection to be included in the request packet, and send the request packet to the backend server through the second TCP connection.

The backend server in the disclosed embodiment includes a backend module that is configured to directly feed back a generated response packet to the client according to the identification information of the first TCP connection, where the identification information of the first TCP connection includes the client address.

Specifically, the frontend module and the backend module all work in the kernel layer of the respective server. The frontend module writes the identification information of the first TCP connection into the TCP option of the request packet at the kernel layer, and sends, at the kernel layer, the request packet with the written identification information of the first TCP connection to the backend server through the second TCP connection.

More specifically, the backend module is further configured to receive mapping logic of the first TCP connection and the second TCP connection sent by the proxy server. Moreover, the backend module is further configured to modify the response packet according to the mapping logic of the first TCP connection and the second TCP connection, and change the destination IP of the response packet to the client address.

It should be noted that the frontend module may also disconnect the first TCP connection at the kernel layer and delete the identification information of the first TCP connection. The backend module is also configured to disconnect the second TCP connection at the kernel layer and delete the identification information of the second TCP connection. That is, when both the client and the backend server are closed, the frontend module and the backend module need to release resources and delete connection record entries, to improve the resources utilization of the respective server. For instance:

1. The backend server closes the connection. After receiving the FIN packet, the backend module records the status, copies the FIN packet, and forwards the FIN packet to the frontend module. At the same time, the backend module modifies the FIN packet and sends the modified FIN packet directly to the client. After receiving the FIN packet, the frontend module records the status. After receiving the FIN packet, the client replies an ACK acknowledgment packet to the frontend module. The frontend module modifies the ACK acknowledgment packet and forwards the modified ACK acknowledgment packet to the backend module, to allow the connection with the backend server to be closed.

2. The client closes the connection. The client sends the FIN packet to the frontend module. The frontend module modifies the FIN packet and forwards the modified FIN packet to the backend module. The frontend module records the status of the connection as closed, and the frontend module deletes the identification information of the first TCP connection. After receiving the FIN packet, the backend module also deletes the identification information of the second TCP connection. At the same time, the backend server returns an ACK acknowledgment packet after receiving the FIN packet, and the backend module modifies the ACK acknowledgment packet and directly sends the modified packet to the client, to allow the connection with the client to be closed.

It should be noted that the frontend module and the backend module may set a timeout timer for delayed deletion of the identification information. For instance, the frontend module records the status of the connection as closed, and the frontend module activates a timeout timer to delay the deleting of the identification information of the first TCP connection. After receiving the FIN packet, the backend module also activates a timeout timer to delay the deleting of the identification information of the second TCP connection. When the timeout timers of the frontend module and the backend module are triggered, the frontend module deletes the identification information of the first TCP connection, and the backend module deletes the identification information of the second TCP connection. In this way, the entire server cluster has really good compatibility and the fault tolerance rate is high.

Apparently, the present embodiment is a system embodiment corresponding to Embodiment 2. The present embodiment may be implemented in cooperation with Embodiment 2. The related technical details discussed in Embodiment 2 are still valid in the present embodiment, and are not described herein again in order to reduce repetition. Accordingly, the related technical details discussed in the present embodiment may also be applied to Embodiment 2.

A person skilled in the art may understand that all or part of the steps of the foregoing embodiments may take the form of implementation of programs for instructing relevant hardware. The programs may be stored in a storage medium, and include a series of instructions that enable a device (may be a microcontroller, a chip, etc.) or a processor to perform all or part of the steps of each embodiment of the present disclosure. The storage medium includes various media for storing program code, such as a flash drive, a mobile hard drive, a read-only memory (ROM), a random access memory (RAM), a magnetic disk, or an optical disk, and the like.

A person skilled in the art may also understand that the foregoing embodiments are merely specific embodiments for implementing the present disclosure. In real applications, various modifications may be made in the form and details of these embodiments without departing from the spirit and principle of the present disclosure.

What is claimed is:

1. A data transmission method applied to a proxy server, comprising:
receiving a request packet sent by a client through a first TCP (Transmission Control Protocol) connection established with the client;
selecting a backend server based on the request packet, and establishing a second TCP connection with the selected backend server; and enabling identification information of the first TCP connection to be included in the request packet, and sending the request packet to the backend server through the second TCP connection to allow the backend server to directly feed back a generated response packet to the client based on the identification information of the first TCP connection, wherein the identification information of the first TCP connection includes a client address;

wherein, the backend server directly feeds back the generated response packet to the client, comprising:

the backend server changes a destination IP (Internet Protocol) of the generated response packet to the client address, directly feeds back the generated response packet to the client at a kernel layer of the backend server;

wherein enabling the identification information of the first TCP connection to be included in the request packet and sending the request packet to the backend server through the second TCP connection further includes:
writing, at a kernel layer, the identification information of the first TCP connection into a TCP option of the request packet, and sending, by the kernel layer, the request packet including the written identification information of the first TCP connection to the backend server through the second TCP connection.

2. The data transmission method according to claim 1 wherein, after sending, by the kernel layer, the request packet including the identification information of the first TCP connection to the backend server through the second TCP connection, the method further includes:
notifying, by the kernel layer, an application layer to disconnect the first TCP connection and the second TCP connection.

3. The data transmission method according to claim 1, wherein, after establishing the second TCP connection with the selected backend server, the method further includes:
generating mapping logic of the first TCP connection and the second TCP connection, wherein the mapping logic includes at least a first difference and a second difference, the first difference is a difference between a sequence number of a syn packet from the proxy server to the backend server and a sequence number of a syn packet from the client to the proxy server, and the second difference is a difference between a sequence number of a syn-ack packet from the backend server to the proxy server and a sequence number of a syn-ack packet from the proxy server to the client.

4. The data transmission method according to claim 3, wherein, after enabling the identification information of the first TCP connection to be included in the request packet and sending the request packet to the backend server through the second TCP connection, the method further includes:
receiving an acknowledgment packet from the client;
determining a sequence number of the acknowledgment packet and an acknowledge sequence number of the acknowledgment packet;
adding the sequence number of the acknowledgement packet to the first difference to obtain a new sequence number, updating the sequence number of the acknowledgement packet with the new sequence number, adding the acknowledge sequence number of the acknowledgement packet to the second difference to obtain a new acknowledgement sequence number, and updating the acknowledge sequence number of the acknowledgement packet with the new acknowledgement sequence number; and forwarding the updated acknowledgment packet to a corresponding backend server.

5. The data transmission method according to claim 1, further comprising:
when there is no packet received from the client within a preset time period, disconnecting the first TCP connection at a kernel layer, and deleting the identification information of the first TCP connection.

6. A data transmission method applied to a backend server, comprising:
receiving a request packet sent by a proxy server through a second TCP (Transmission Control Protocol) connection established with the proxy server; and
directly feeding back a generated response packet to a client based on identification information of a first TCP connection included in the request packet, wherein the first TCP connection is a TCP connection established between the client and the proxy server, and the identification information of the first TCP connection includes a client address;

wherein, directly feeding back the generated response packet to a client, comprising:
changing a destination IP (Internet Protocol) of the generated response packet to the client address, directly feeding back the generated response packet to the client at a kernel layer of the backend server;

wherein, after the second TCP connection is established with the proxy server, the method further includes:
receiving mapping logic of the first TCP connection and the second TCP connection sent by the proxy server; and
wherein directly feeding back the generated response packet to the client further includes:
modifying the generated response packet based on the mapping logic of the first TCP connection and the second TCP connection, and changing the destination IP of the generated response packet to the client address; and
forwarding, at the kernel layer, the modified response packet to the client.

7. The data transmission method according to claim 6 wherein the mapping logic includes a first difference and a second difference, the first difference being a difference between a sequence number of a syn packet from the proxy server to the backend server and a sequence number of a syn packet from the client to the proxy server, and the second difference being a difference between a sequence number of a syn-ack packet from the backend server to the proxy server and a sequence number of a syn-ack packet from the proxy server to the client; and
wherein modifying the response packet based on the mapping logic of the first TCP connection and the second TCP connection further includes:
obtaining a sequence number of the response packet and an acknowledgment sequence number of the response packet;
determining a difference between the sequence number of the response packet and the second difference to obtain a new sequence number, and updating the sequence number of the response packet with the new sequence number; and
determining a difference between the acknowledgment sequence number of the response packet and the first difference to obtain a new acknowledgment sequence number, and updating the acknowledgment sequence number of the response packet with the new acknowledgment sequence number.

8. A data transmission system, comprising: a proxy server and a plurality of backend servers; wherein
the proxy server includes:
a receiving module that is configured to receive a request packet sent by a client through a first TCP (Transmission Control Protocol) connection established with the client,
a selection module that is configured to select a backend server based on the request packet, and establish a second TCP connection with the selected backend server, and
a frontend module that is configured to allow identification information of the first TCP connection to be included the request packet, and send the request packet to the backend server through the second TCP connection; and
a backend server includes:
a backend module that is configured to directly feed back a generated response packet to the client based on the identification information of the first TCP connection, wherein the identification information of the first TCP connection includes a client address;
wherein, directly feeding back the generated response packet to the client, comprising:
changing a destination IP (Internet Protocol) of the generated response packet to the client address, directly feeding back the generated response packet to the client at a kernel layer of the backend server;
wherein, the frontend module is further configured to write, at a kernel layer, the identification information of the first TCP connection to a TCP option of the request packet, and send, by the kernel layer, the request packet including the written identification information of the first TCP connection to the backend server through the second TCP connection.

9. The data transmission system according to claim 8, wherein the backend module is further configured to:
receive mapping logic of the first TCP connection and the second TCP connection sent by the proxy server;
modify the response packet according to the mapping logic of the first TCP connection and the second TCP connection and modify a destination IP of the response packet to the client address; and
forward, at a kernel layer, the modified response packet to the client.

10. The data transmission system according to claim 8, wherein:
the frontend module is further configured to disconnect, at the kernel layer, the first TCP connection and delete the identification information of the first TCP connection; and
the backend module is further configured to disconnect, at the kernel layer, the second TCP connection and delete identification information of the second TCP connection.

11. The data transmission method according to claim 3, further comprising:
transmitting, by the proxy server, the mapping logic to the backend server.

12. The data transmission method according to claim 1, wherein the proxy server receives the request packet through a kernel layer of the proxy server, modifies the request packet, and sends the modified request packet to a kernel layer of the backend server.

13. The data transmission method according to claim 6, further comprising:
if the backend server does not receive the request packet sent by the proxy server through the second TCP connection in a predefined period, deleting, by the backend server, the identification information of the first TCP connection, and deleting the mapping logic of the first TCP connection and the second TCP connection.

14. The data transmission method according to claim 6 further comprising:
changing a source IP and a source port of the response packet to an IP and a port of the proxy server.

* * * * *